US008209443B2

(12) United States Patent
Basavaraju et al.

(10) Patent No.: US 8,209,443 B2
(45) Date of Patent: Jun. 26, 2012

(54) SYSTEM AND METHOD FOR IDENTIFYING LOST/STALE HARDWARE IN A COMPUTING SYSTEM

(75) Inventors: Jeevan Basavaraju, Karnataka (IN); Harish Kuttan, Trichur Kerala (IN); Santosh Ananth Rao, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 12/212,851

(22) Filed: Sep. 18, 2008

(65) Prior Publication Data

US 2009/0198842 A1 Aug. 6, 2009

Related U.S. Application Data

(60) Provisional application No. 61/024,910, filed on Jan. 31, 2008.

(51) Int. Cl.
G06F 3/00 (2006.01)
G06F 11/00 (2006.01)

(52) U.S. Cl. ............... 710/16; 710/15; 710/27; 710/18; 726/34; 726/35; 726/36

(58) Field of Classification Search ........... 710/8, 17–19
See application file for complete search history.

(56) References Cited

U.S. PATENT DOCUMENTS

| | | | | |
|---|---|---|---|---|
| 6,160,796 | A * | 12/2000 | Zou | 370/257 |
| 2002/0083228 | A1 * | 6/2002 | Chiloyan et al. | 710/9 |
| 2002/0161596 | A1 * | 10/2002 | Johnson et al. | 705/1 |
| 2004/0078497 | A1 * | 4/2004 | Nalawadi et al. | 710/8 |
| 2005/0071390 | A1 | 3/2005 | Midgley et al. | |
| 2005/0071391 | A1 | 3/2005 | Fuerderer et al. | |
| 2006/0015544 | A1 | 1/2006 | Kodama | |
| 2007/0079171 | A1 | 4/2007 | Aidun | |

OTHER PUBLICATIONS http://replay.web.archive.org/20070528160523/http://msdn2.microsoft.com/en-us/library/ms724182.aspx.
http://replay.web.archive.org/20070604043900/http://support.microsoft.com/kb/256986, Jan. 27, 2007.

* cited by examiner

Primary Examiner — Eron J Sorrell
Assistant Examiner — Dean Phan

(57) ABSTRACT

A system and method for identifying lost/stale peripheral hardware devices connected to an enterprise computer system is disclosed. In one embodiment, a method for identifying lost peripheral hardware devices connected to an enterprise computer system includes initializing system memory by obtaining data structures associated with last detected connected peripheral hardware devices stored in an external database upon reboot, initiating an enterprise computer system wide scanning to obtain the detected data structures associated with current connected peripheral hardware devices during the reboot, and comparing the obtained data structures associated with the last detected connected peripheral hardware devices and the current connected peripheral hardware devices to determine whether there is any chance in system resources associated with the connected peripheral hardware devices during the reboot.

18 Claims, 6 Drawing Sheets

US 8,209,443 B2

SYSTEM AND METHOD FOR IDENTIFYING LOST/STALE HARDWARE IN A COMPUTING SYSTEM

CROSS-REFERENCE TO RELATED APPLICATIONS

This Utility Patent Application is based on and claims the benefit of U.S. Provisional Application No. 61/024,910, filed on Jan. 31, 2008, the contents of which are hereby incorporated by reference in their entirety.

BACKGROUND

It is a common practice within an enterprise to deploy servers with multiple peripheral hardware devices, such as disk arrays, network cards, tape drives, processors and the like. In such a scenario, typically, during a boot-up/reboot process, operating system initiates a system wide scan to detect any existing peripheral hardware devices connected to the system. Upon detecting the existing connected peripheral hardware devices, the operating system updates existing data structure information residing in system memory with current data structure information associated with the detected peripheral hardware devices.

However, if one or more peripheral hardware devices get disconnected between reboots, current techniques may not know whether they are lost and/or disconnected peripheral hardware devices as the operating system updates the data structure information residing in the system memory upon every reboot with the current data structure information. This can result in consuming unused system resources, such as instance numbers that get assigned to the connected peripheral hardware devices during each reboot. It can be seen that as the number of disconnected peripheral hardware devices increases, the unused system resources can also significantly increase and can result in consuming significant system resources.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A system and method for identifying lost/stale peripheral hardware devices connected to an enterprise computer system are disclosed. In the following description, for purposes of explanation, numerous specific details are set forth in order to provide a thorough understanding of the various embodiments. It will be evident, however, to one skilled in the art that the various embodiments may be practiced without these specific details.

The terms "reboot" and "boot-up" are used interchangeably throughout the document.

Figure 1:
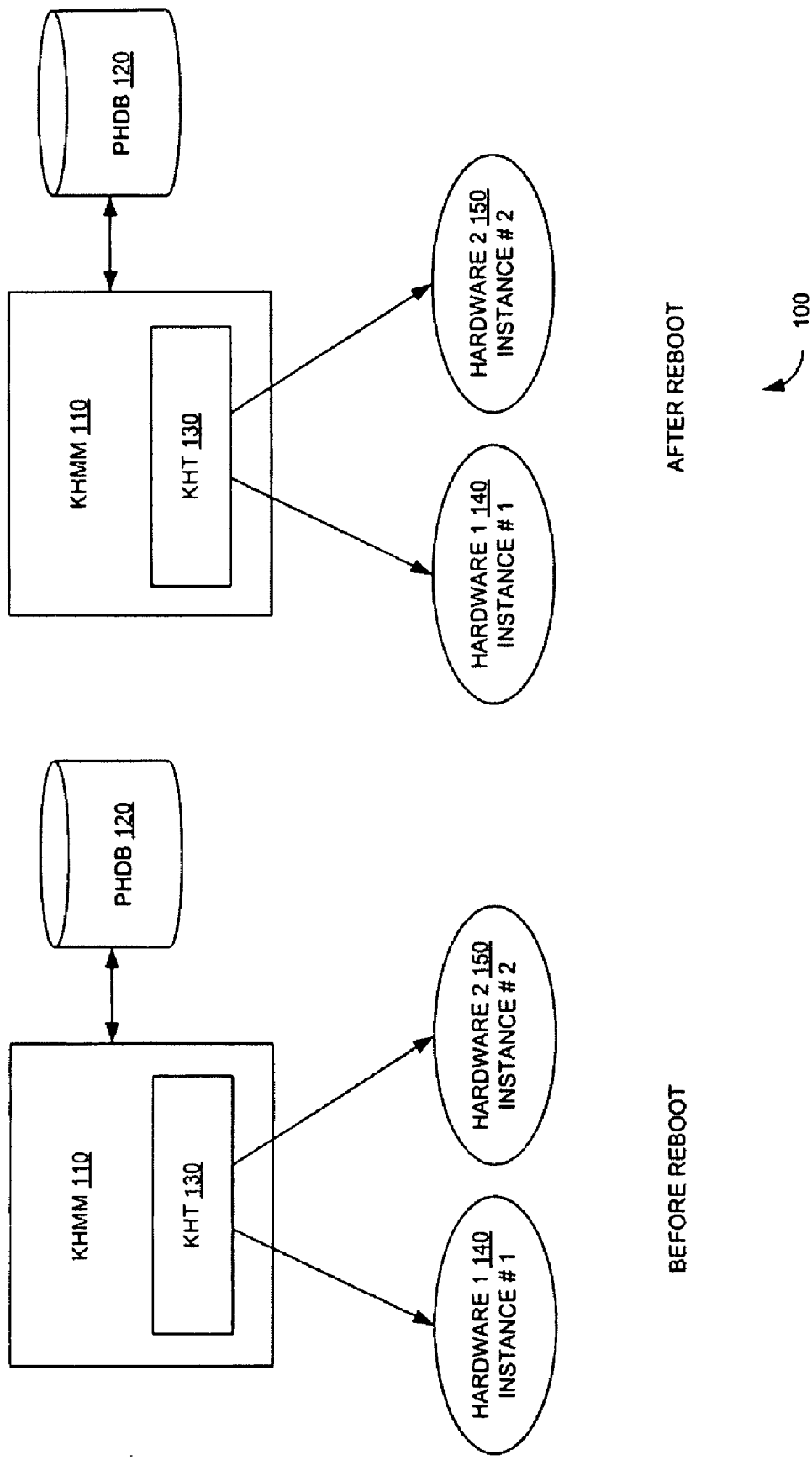
FIG. 1 is a block diagram illustrating a high level architecture for identifying existing peripheral hardware devices connected to a computing system, according to one embodiment.

FIG. 1 is a block diagram 100 illustrating a high level architecture for identifying existing peripheral hardware devices connected to a computing system, according to one embodiment. Particularly, FIG. 1 illustrates a before reboot scenario and an after reboot scenario. As illustrated, FIG. 1 includes a kernel hardware management module (KHMM) 110, a persistent hardware database (PHDB) 120, a kernel hardware table (KHT) 130, and peripheral hardware devices 1 140 and 2 150.

The KHMM 110 resides in an operating system (OS) and is communicatively coupled to the PHDB 120 and the KHT 130. The KHMM 110 is a module that maintains a runtime database of platform and input/output (I/O) components of an enterprise computer system. In one embodiment, the KHMM 110 manages system resources such as hardware id, instance number (e.g., instance #1, instance #2 illustrated in FIG. 1). For example, the hardware location id and instance number include details associated with the platform and the I/O components. In another embodiment, the KHMM 110 stores the runtime information in the database which is persistent across reboots, such that saved information can be reused during system reboots.

The PHDB 120 (e.g., stored in an external memory) stores persistent information that includes system wide information associated with hardware components such as hardware location id, instance number, class of hardware component, driver names, etc. The PHDB 120 also includes information associated with each of the usable platform and the I/O components found on the enterprise computer system. For example, the persistent information associated with the usable hardware is stored in a location and can be reused by OS across reboots.

In operation, the KHMM 110 initializes the KHT 130 (e.g., stored in system memory) by obtaining and storing data structures associated with last detected connected peripheral hardware devices 1 140 and 2 150 stored in the PHDB 120 upon reboot. At the end of the initialization process, the KHT 130 contains an in memory copy of contents of the PHDB 120. In some embodiments, OS software invokes the KHMM 110. In these embodiments, the KHMM 110 obtains the data structures through reading the persistent information from the PHDB 120. Further, the KHMM 110 initiates an enterprise computer system wide scanning to obtain the data structure details associated with current connected peripheral hardware devices 1 140 and 2 150 during the reboot.

In some embodiments, the KHMM 110 determines whether there is any change in the system resources associated with the connected peripheral hardware devices 1 140 and 2 150 by comparing the obtained data structures associated with the last detected connected peripheral hardware devices and the current connected peripheral hardware devices during the reboot. For example, the data structures (e.g., information) associated with the last detected connected peripheral hardware devices is stored in the PHDB 120 and the data structures associated with the current connected peripheral hardware devices is present in the KHT 130. Further, the KHMM 110 determines as no change is detected in the connected peripheral hardware devices in the enterprise computer system if there is no change in the system resources associated with the connected peripheral hardware devices found based on the outcome of the comparison.

In some embodiments, the connected peripheral hardware devices 1 140 and 2 150 are configured as per last detected connected peripheral hardware devices (i.e., the detected connected peripheral hardware devices 1 140 and 2 150 are configured with the same resources (e.g., obtained from the PHDB 120) as in previous incarnation of the OS. Hence, all attributes (e.g., hardware location id, instance number, etc.) of the connected peripheral hardware devices 1 140 and 2 150 are retained ensuring that the resources assigned to the connected peripheral hardware devices 1 140 and 2 150 found during the enterprise computer system wide scan remain same across reboots as illustrated in FIG. 1.

Figure 2:
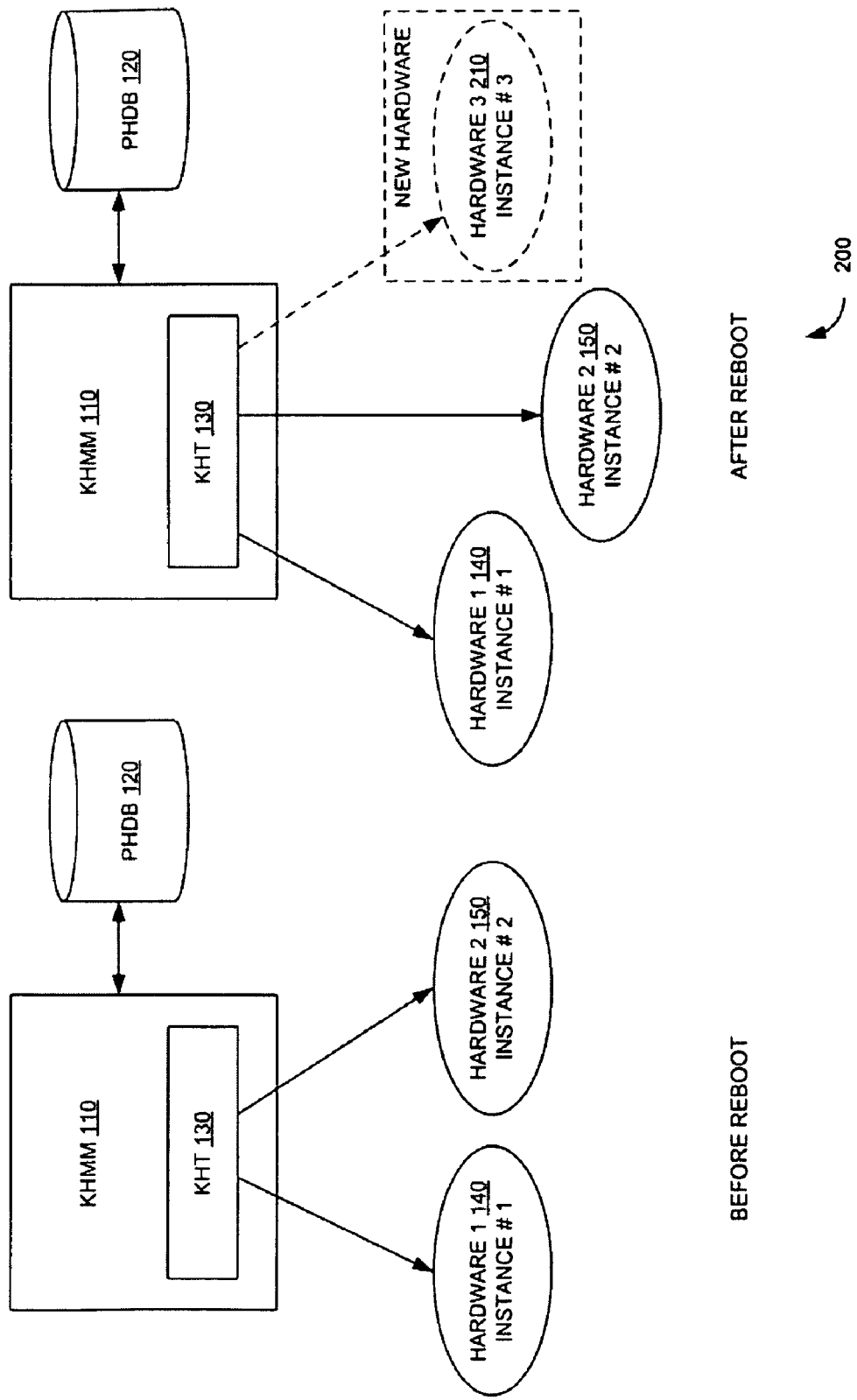
FIG. 2 is a block diagram illustrating a high level architecture for identifying existing and new peripheral hardware devices connected to an enterprise computer system, according to one embodiment.

FIG. 2 is a block diagram 200 illustrating a high level architecture for identifying existing and new peripheral hardware devices connected to the enterprise computer system, according to one embodiment. Particularly, FIG. 2 illustrates a before reboot scenario and an after reboot scenario. As illustrated, FIG. 1 includes the KHMM 110, the PHDB 120, the KHT 130, the peripheral hardware devices 1 140 and 2 150 and a new peripheral hardware device 3 210 in the after reboot scenario.

FIG. 2 illustrates an example when a new peripheral hardware device 3 210 is detected across the reboot process. In this example, during the reboot process, the OS invokes the KHMM 110 to read persistent information from the PHDB 120 (e.g., residing in the external memory) and initializes the KHT 130 stored in the system memory. After initializing the KHT 130, the KHMM 110 initiates an enterprise computer system wide scanning to obtain data structure details associated with the current connected peripheral hardware devices 1 140 and 2 150 during the reboot.

Further, the KHMM 110 determines whether there is any change in the system resources associated with the connected peripheral hardware devices 1 140 and 2 150 by comparing the obtained data structures associated with the last detected connected peripheral hardware devices and the current connected peripheral hardware devices during the reboot. For example, the data structures associated with the last detected connected peripheral hardware devices is stored in the PHDB 120 and the data structures associated with the current connected peripheral hardware devices is present in the KHT 130. In these embodiment, if no change is found in the system resources associated with the connected peripheral hardware devices 1 140 and 2 150 based on the outcome of the comparison, then the KHMM 110 determines as no change is detected in the connected peripheral hardware devices in the enterprise computer system. In this scenario, the peripheral hardware devices 1 140 and 2 150 are configured as per resource information associated with the last detected connected peripheral hardware devices.

Based on the outcome of the comparison, if the KHMM 110 determines a change in the system resources associated with the connected peripheral hardware devices (e.g., the peripheral hardware device 3 210 of FIG. 2) the scenario differs from the previous scenario. For example, as the detected peripheral hardware device 3 210 was not present in the previous incarnation of the OS, there is no match found with the data present in the KHT 130. In such a scenario, if a new usable peripheral hardware device 3 210 is detected in the system whose hardware location id, instance number, etc. do not match with any of existing information found in the KHT 130, then the KHMM 110 declares the one or more peripheral hardware devices connected to the enterprise computer system as new. Also, new system resources are allocated to the newly detected peripheral hardware device 3 210. Further, the KHMM 110 updates the details of the new peripheral hardware device 3 210 into the PHDB 120 and the KHT 130.

Figure 3:
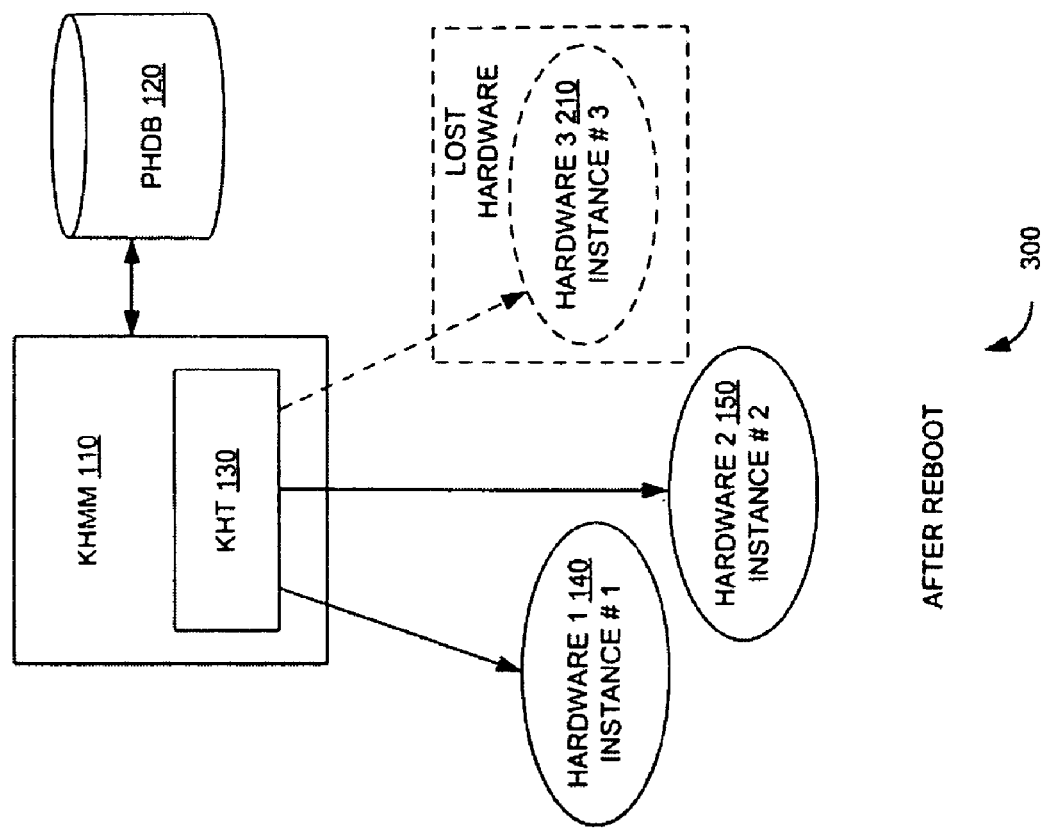
FIG. 3 is a block diagram illustrating a high level architecture for identifying lost peripheral hardware devices connected to the enterprise computer system, according to one embodiment.
Figure 3:
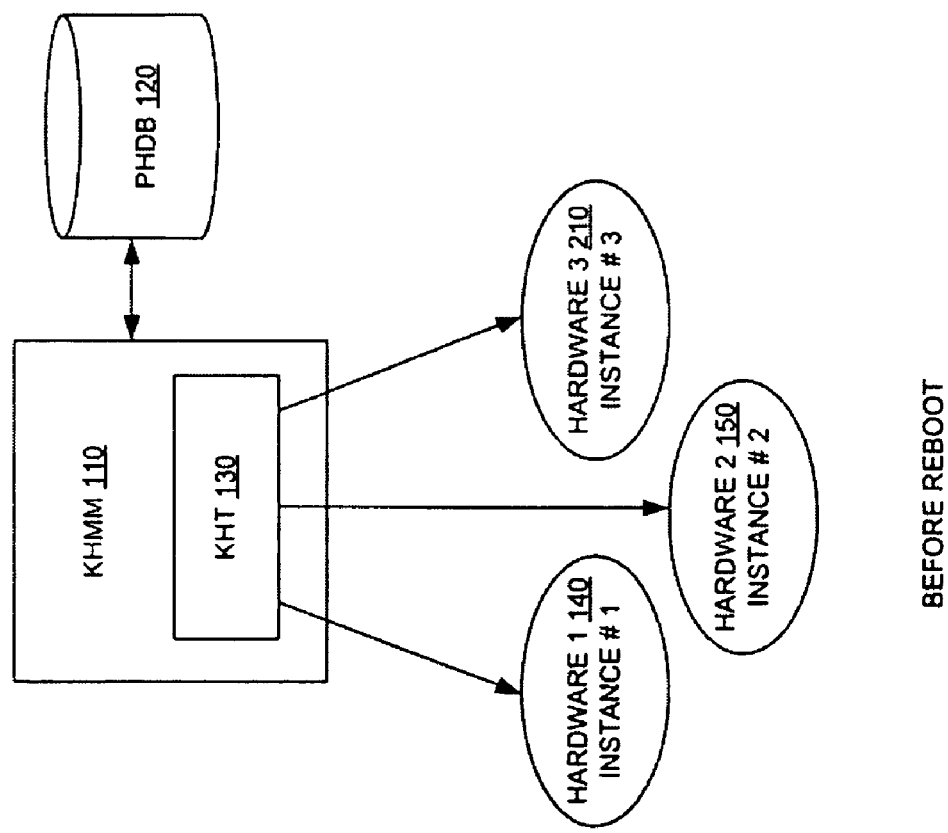

FIG. 3 is a block diagram 300 illustrating a high level architecture for identifying lost peripheral hardware devices connected to the enterprise computer system, according to one embodiment. Particularly, FIG. 3 illustrates the KHMM 110 residing in the OS, the PHDB 120, the KHT 130 residing in the system memory and the peripheral hardware devices 1 140, 2 150 and 3 210 communicatively connected to the OS via the KHMM 110.

In the example embodiment, FIG. 3 represents a scenario before the reboot process where there are three peripheral hardware devices (e.g., the hardware 1 140, the hardware 2 150 and the hardware 3 210) connected to the enterprise computer system. Consider the enterprise computer system to be physically moved to a new location where only two of the three peripheral hardware devices (i.e., the hardware 1 140 and the hardware 2 150) are connected. The peripheral hardware devices 1 140 and 2 150 get configured with the same resources as last reboot whereas the peripheral hardware device 3 210 will be marked as stale or lost and the information regarding the peripheral hardware device 3 210 will be presented as the lost hardware to the user.

The identification of lost peripheral hardware device 3 210 includes two phases (e.g., a first phase and a second phase). The first phase includes steps to mark a hardware location as stale hardware in the KHT 130 during the enterprise computer system wide scan. The second phase includes steps to compare the hardware locations marked as stale in the KHT 130 with information present in the PHDB 120 and present them to the user as a lost hardware.

In the first phase, all steps leading up to an enterprise computer system wide scan remain the same as in the previous scenarios i.e., OS invokes the KHMM 110. The KHMM 110 in turn initializes the KHT 130 by obtaining and storing data structures associated with last detected connected peripheral hardware devices (e.g., the hardware 1 140, 2 150 and 3 210) stored in the PHDB 120 upon the reboot process. After initializing the KHT 130, the KHMM 110 initiates the enterprise computer system wide scanning to obtain the detected data structures associated with the current connected peripheral hardware devices (e.g., the hardware 1 140 and 2 150) during the reboot.

In some embodiments, the KHMM 110 determines whether there is any change in the system resources associated with the connected peripheral hardware devices by comparing the obtained data structures associated with the last detected connected peripheral hardware devices and the current connected peripheral hardware devices during the reboot. For example, the data structures (e.g., information) associated with the last detected connected peripheral hardware devices is stored in the PHDB 120 and the data structures associated with the current connected peripheral hardware devices is present in the KHT 130. In one embodiment, if there is a change in the system resources associated with the connected peripheral hardware devices found based on the outcome of the comparison, the KHMM 110 determines whether the change is associated with one or more lost peripheral hardware devices. In this embodiment, if the KHMM 110 determines that there is a change in the system resources associated with the connected peripheral hardware devices (e.g., as the KHMM 110 could not find any peripheral hardware device at the given location), then the KHMM 110 declares as there is one or more lost peripheral hardware devices connected to the enterprise computer system and assigns hardware locations associated with the assigned one or more lost peripheral hardware devices as lost peripheral hardware devices. Further, the assigned hardware location(s) is marked as lost/stale in the KHT 130.

The second phase in the identification of lost peripheral hardware device includes determining whether a stale entry present in the KHT 130 actually represents a lost hardware from the last reboot. During the second phase, the KHMM 110 determines whether there is any hardware locations assigned as lost (during the reboot) present in the KHT 130 by searching the system memory for each of the stored data structure entries in the KHT 130.

If one or more hardware locations are assigned as lost in the KHT 130, then the KHMM 110 determines whether any found associated one or more of the hardware locations assigned as lost in the KHT 130 is also present in the associated one or more hardware locations stored in the PHDB 120. In this embodiment, if the found associated one or more of the hardware locations assigned as lost in the KHT 130 is also present in the associated one or more hardware locations in the external hardware, the KHMM 110 declares the one or more peripheral hardware devices associated with the found one or more hardware locations as lost and presents the associated data structures as lost to the user.

Further, the information presented to the user includes class, instance number, hardware location id, driver name, etc. associated with the peripheral hardware devices in the last reboot. Also, the KHMM 110 declares the one or more peripheral hardware devices associated with the found one or more hardware locations as not lost in the KHT 130 if the found associated one or more of the hardware locations assigned as lost in the KHT 130 is not present in the associated one or more hardware locations in the PHDB 120. In some embodiments, the KHMM 110 removes the data structure information associated with the one or more peripheral hardware devices that are declared and outputted as lost from the KHT 130 and the PHDB 120. Thus system resources assigned to stale or lost hardware becomes reclaimable for reuse by other peripheral hardware devices.

Figure 4:
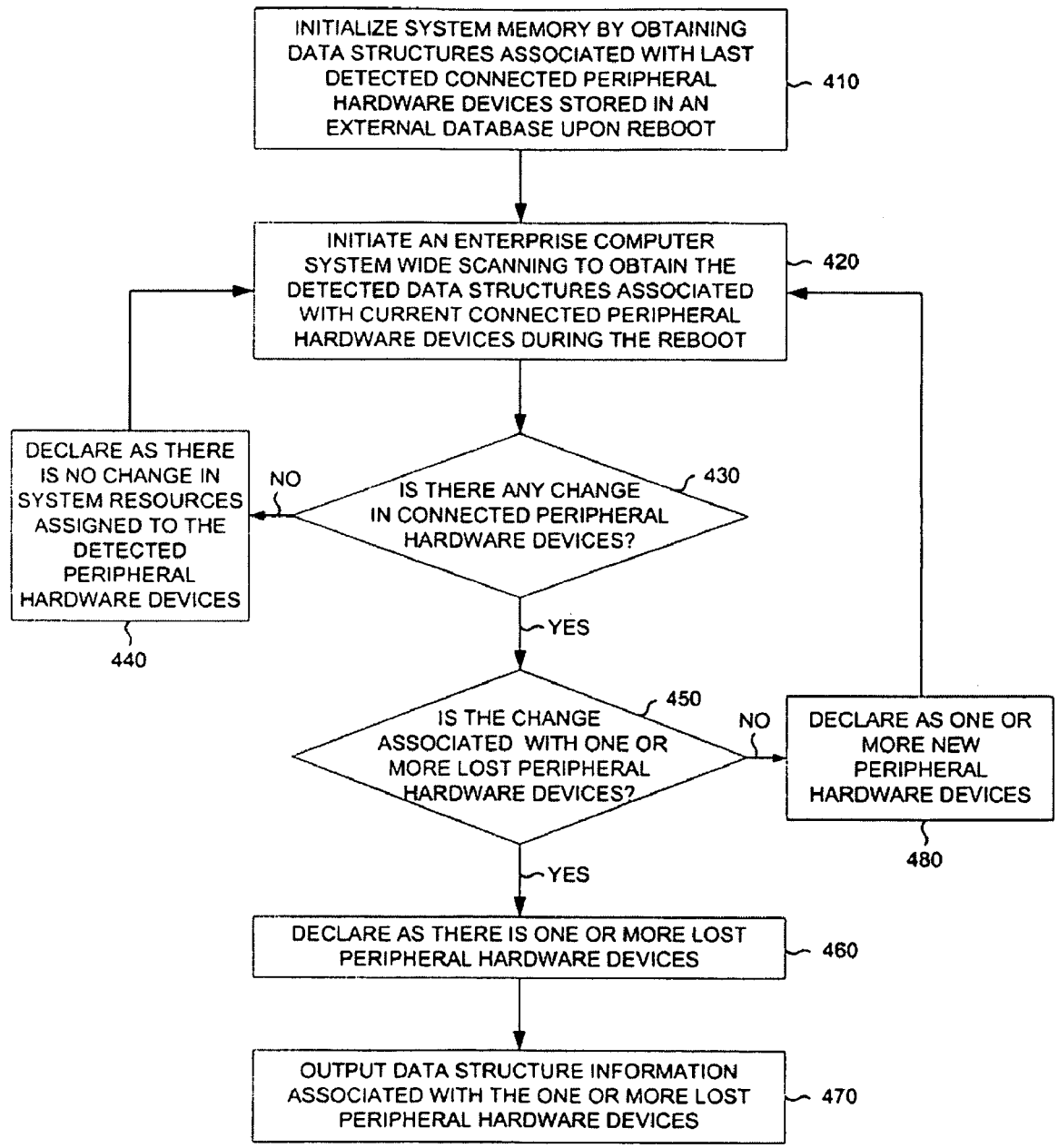
FIG. 4 is a process flow of identifying lost or stale peripheral hardware devices connected to the enterprise computer system, according to one embodiment.

FIG. 4 is a process flow 400 of identifying lost peripheral hardware devices connected to an enterprise computer system, according to one embodiment. In operation 410, system memory is initialized by obtaining data structures associated with last detected connected peripheral hardware devices stored in an external database upon reboot. In operation 420, an enterprise computer system wide scanning is initiated to obtain the detected data structures associated with current connected peripheral hardware devices during the reboot.

In operation 430, it is determined whether there is any change in the connected peripheral hardware devices. In some embodiments, the obtained data structures associated with the last detected connected peripheral hardware devices and the current connected peripheral hardware devices are compared to determine whether there is any change in the system resources associated with the connected peripheral hardware devices during the reboot.

In operation 430, if it is determined that there is no change in the connected peripheral hardware devices, the process 400 goes to operation 440 and declares that there is no change in system resources assigned to the detected peripheral hardware devices, else the process 400 goes to operation 450. In these embodiments, the enterprise computer system is configured per the detected peripheral hardware devices during the reboot since no change is detected in the connected peripheral devices.

The process 400 is then routed back to operation 420 to perform applicable operations 420-470 upon performing the operation 440. In operation 450, it is determined whether the change is associated with one or more lost peripheral hardware devices. If it is determined that the change is associated with one or more lost peripheral hardware devices, then the process 400 goes to operation 460 and declares as there is one or more lost peripheral hardware devices connected to the enterprise computer system. In these embodiments, hardware locations associated with the one or more lost peripheral hardware devices are assigned as lost peripheral hardware devices.

Further, the data structure information associated with the one or more lost peripheral hardware devices are outputted to the user in operation 470. If in operation 450, it is determined that the change is not associated with the one or more lost peripheral hardware devices, the process 400 goes to operation 480 and declares as one or more new peripheral hardware devices connected to the enterprise computer system. In these embodiments, new system resources are allocated to the newly detected peripheral hardware devices. The process 400 then goes to operation 420 and performs applicable operations 420-470 upon performing the operation 480.

Figure 5:
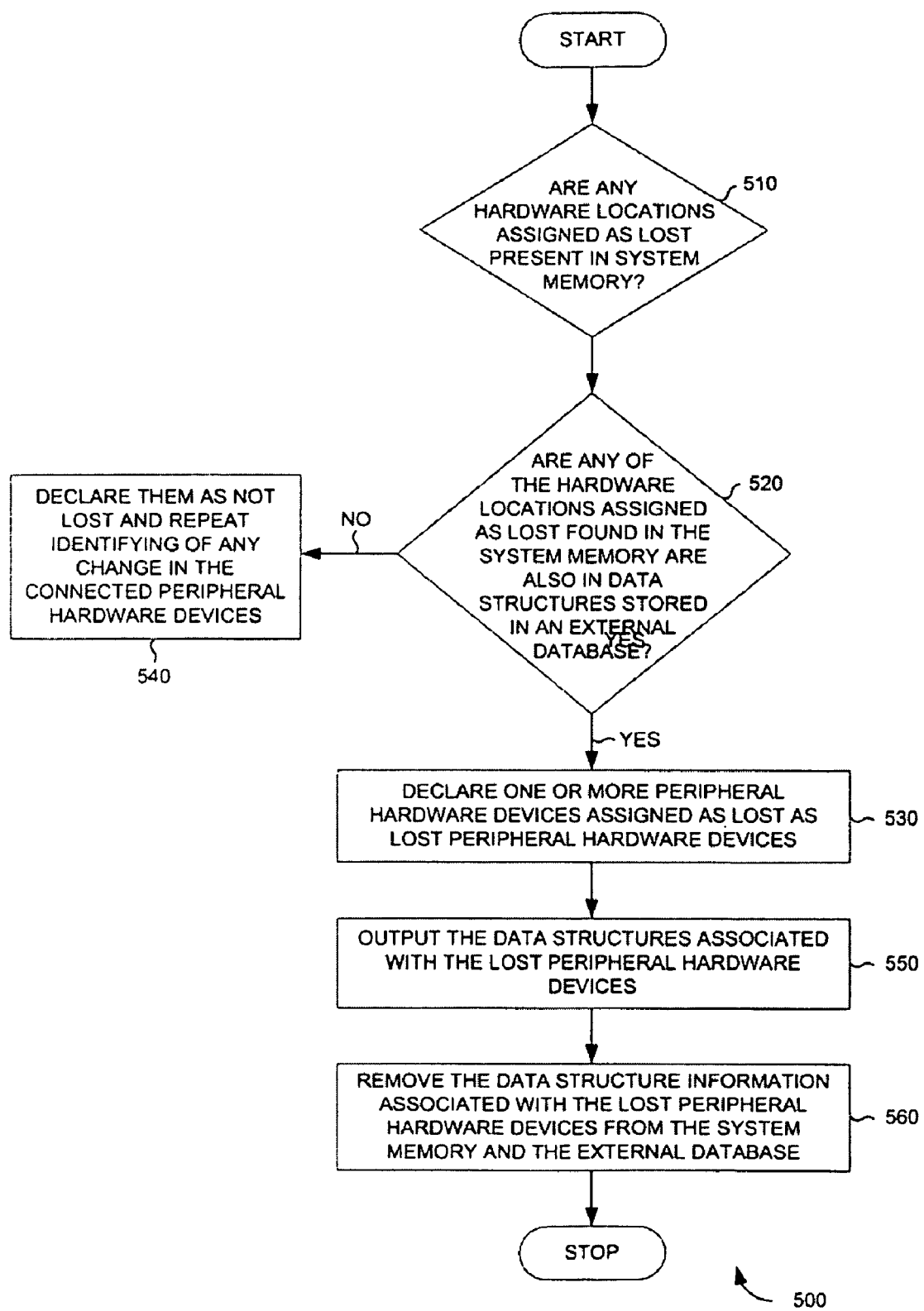
FIG. 5 is a process flow of identifying lost or stale peripheral hardware devices connected to the enterprise computer system, according to another embodiment.

FIG. 5 is a process flow 500 of identifying lost peripheral hardware devices connected to an enterprise computer system, according to one embodiment. In operation 510, it is determined whether hardware locations assigned as lost during reboot are present in system memory. In some embodiments, the determination is made by searching the KHT 130 stored in system memory for each of stored data structure entries associated with detected one or more peripheral hardware devices.

In operation 520, it is determined whether the hardware locations assigned as lost found in the system memory is also present in data structures stored in the PHDB 120 that is stored in the external database. If it is determined that the hardware locations assigned as lost are also present in the PHDB 120 stored in the external database, then the process 500 goes to operation 530 and declares the one or more peripheral hardware devices associated with the found one or more hardware locations assigned as lost as lost peripheral hardware devices, else the process 500 goes to operation 540 and declares the one or more peripheral hardware devices as not lost.

Further, in operation 540, the steps of initializing, initiating, comparing and determining are repeated to identify any change in other connected peripheral hardware devices. In operation 550, data structures associated with the lost peripheral hardware devices are outputted (e.g., presented) as lost to a user. The information presented to the user includes class, instance number, hardware location id, driver name, etc. associated with the lost peripheral hardware device(s) in the last reboot.

In one embodiment, the data structure information associated with the one or more peripheral hardware devices that are declared and outputted as lost is removed from the system memory and the external database as illustrated in operation 560. Thus, removing of data structure information associated with the lost peripheral hardware devices helps to release the system resources consumed by the lost peripheral hardware devices. It can be noted that system resources assigned to the lost peripheral hardware devices can be reclaimed and reused by other peripheral hardware devices connected to the enterprise computer system. Thus, the above described technique, illustrated in FIGS. 4 and 5 facilitates detection and presentation of the lost peripheral hardware devices connected to enterprise computer systems.

Figure 6:
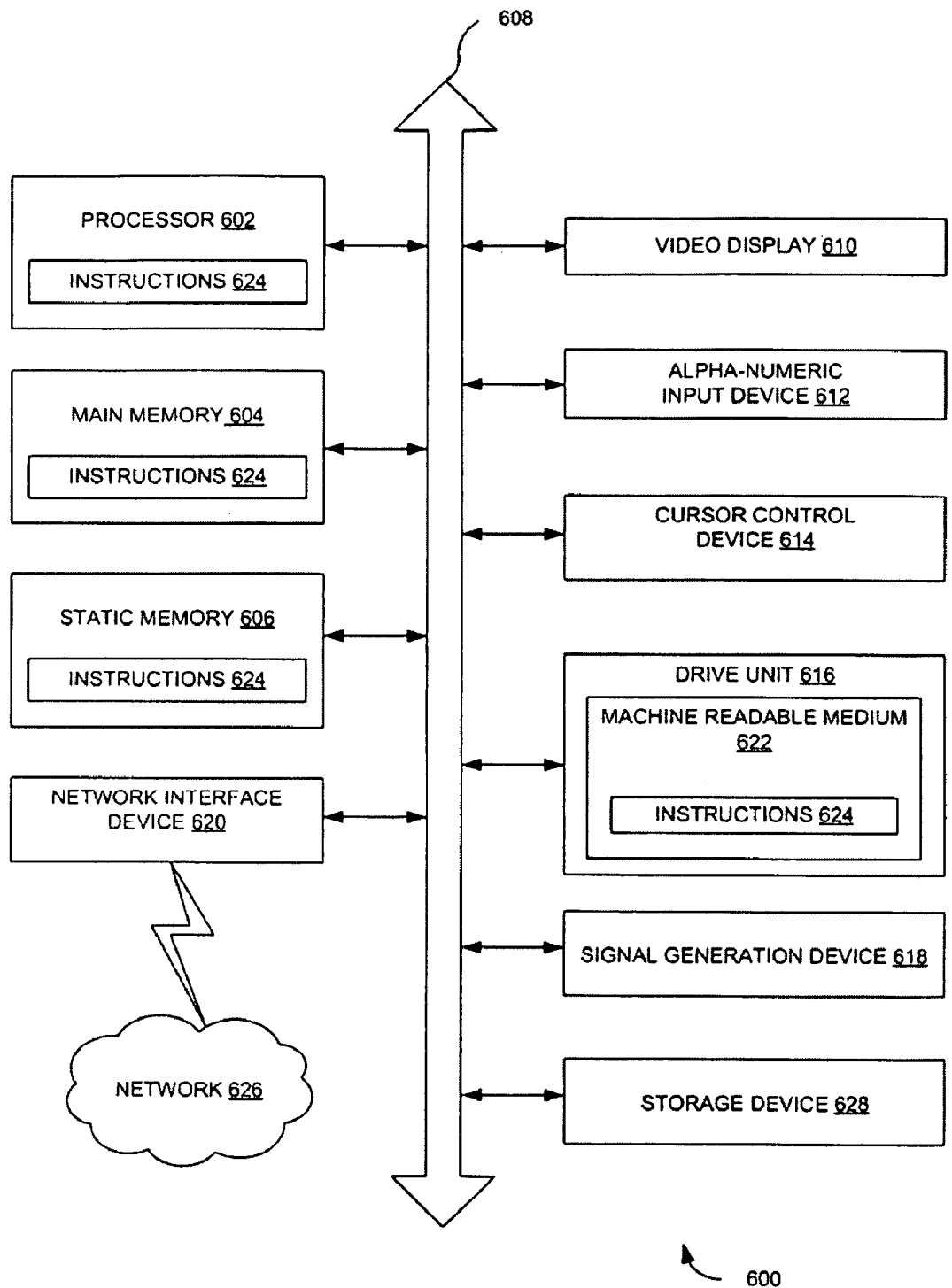
FIG. 6 is a diagrammatic system view of a data processing system in which any of the embodiments disclosed herein may be performed, according to one embodiment.

FIG. 6 is a diagrammatic system view 600 of a data processing system in which any of the embodiments disclosed herein may be performed, according to one embodiment. Particularly, the diagrammatic system view of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624, a network 626 and a storage device 628.

The diagrammatic system view 600 may indicate a personal computer and/or a data processing system in which one or more operations disclosed herein are performed. The processor 602 may be a microprocessor, a state machine, an application specific integrated circuit, a field programmable gate array, etc. The main memory 604 may be a dynamic random access memory and/or a primary memory of a computer system. The static memory 606 may be a hard drive, a flash drive, and/or other memory information associated with the data processing system.

The bus 608 may be an interconnection between various circuits and/or structures of the data processing system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse. The drive unit 616 may be a hard drive, a storage system, and/or other longer term storage subsystem.

The signal generation device 618 may be a BIOS and/or a functional operating system of the data processing system. The network interface device 620 may perform interface functions (e.g., code conversion, protocol conversion, and/or buffering) required for communications to and from the network 626 between a number of independent devices (e.g., of varying protocols). The machine readable medium 622 may provide instructions on which any of the methods disclosed herein may be performed. The instructions 624 may provide source code and/or data code to the processor 602 to enable any one or more operations disclosed herein. The storage device 628 may be a disk, a tape, or any storage medium which is capable of storing data/instructions to perform any of the method disclosed herein.

For example, the storage medium having instructions, that when executed by a computing platform executes a method of identifying whether there is any change in peripheral hardware devices connected to an enterprise computer system, including initializing the system memory by obtaining data structures associated with the last detected connected peripheral hardware devices stored in the external database upon reboot, initiating the enterprise computer system wide scanning to obtain the detected data structures associated with current connected peripheral hardware devices during the reboot, and comparing the obtained data structures associated with last detected connected peripheral hardware devices and the current connected peripheral hardware devices to determine whether there is any change in the system resources associated with the connected peripheral hardware devices during the reboot.

The storage medium may have instructions to determine as no change detected in the connected peripheral hardware devices in the enterprise computer system and to declare that there is no change in system resources assigned to the detected peripheral hardware devices and the enterprise computer system is configured per the detected peripheral hardware devices during reboot, if there is no change in the system resources associated with the connected peripheral hardware devices during the reboot.

Further, the storage medium may have instructions to determine whether the change is associated with one or more lost peripheral hardware devices if there is any change in the system resources associated with the connected peripheral hardware devices during the reboot. In one embodiment, the storage medium may have instructions to declare as there is one or more lost peripheral hardware devices connected to the enterprise computer system and to assign hardware locations associated with the one or more lost peripheral hardware devices as lost peripheral hardware devices if it is determined that the change is associated with one or more lost peripheral hardware devices.

In another embodiment, the storage medium may have instructions to declare as one or more new peripheral hardware devices connected to the enterprise computer system and allocating new system resources to the newly detected peripheral hardware devices if it is determined that the change is not associated with one or more lost peripheral hardware devices. In addition, the storage medium may have instructions to output the data structure associated with one or more lost peripheral hardware devices to the user.

Further, the storage medium may have instructions to determine whether there are any of the hardware locations assigned as lost during the reboot is present by searching the system memory for each of the stored data structure entries associated with the detected one or more peripheral hardware devices. The storage medium may have instructions to determine whether the found associated one or more of the hardware locations assigned as lost in system memory is also present in associated one or more hardware locations in the external database if it is determined that there are hardware locations assigned as lost.

In one embodiment, the storage medium may have instructions to declare the one or more peripheral hardware devices associated with the found one or more hardware locations assigned as lost as lost peripheral hardware devices and to present data structures associated with the declared one or more peripheral hardware devices as lost to the user if the found associated one or more of the hardware locations assigned as lost in system memory is also present in associated one or more hardware locations in the external database. In another embodiment, the storage medium may have instructions to declare the one or more peripheral hardware devices associated with the found one or more hardware locations as not lost in the system memory if the found associated one or more of the hardware locations assigned as lost in system memory is not present in associated one or more hardware locations in the external database.

Further, the storage medium may have instructions to repeat the steps of initializing, initiating, comparing and determining during a next reboot if there are no hardware locations assigned as lost present during the reboot. Also, the storage medium may have instructions to remove the data structure information associated with the one or more peripheral hardware devices that are declared and outputted as lost from the system memory and the external database.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

Even though the above-described technique is described with reference to identifying lost or stale hardware, one can envision that the above technique can be used in detecting intentional or unintentional deletion of peripheral hardware devices connected in an enterprise computer system. The above technique can also clean up such stale information. Further, the above technique can also be used in scenarios where a user wants to reclaim the system resources which are otherwise used by lost or stale peripheral hardware devices. Furthermore, the above technique can also be used for detecting any new connected peripheral hardware devices.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of identifying whether there is any change in peripheral hardware devices connected to an enterprise computer system, comprising:
    initializing a kernel hardware table (KHT) stored in system memory by obtaining data structures associated with last detected connected peripheral hardware devices stored in a persistent hardware database (PHDB) of an external database upon reboot;
    initiating an enterprise computer system wide scanning to obtain and store detected data structures associated with current connected peripheral hardware devices in the KHT during the reboot;
    comparing the obtained data structures associated with the last detected connected peripheral hardware devices and the detected data structures associated with the current connected peripheral hardware devices to determine whether there is any change in system resources associated with the connected peripheral hardware devices during the reboot;
    if so, determining whether the change is associated with one or more lost peripheral hardware devices during the reboot;
    if so, then declaring as there is one or more lost peripheral hardware devices associated with the enterprise computer system and assigning in the KHT hardware locations associated with the one or more lost peripheral hardware devices as lost;
    determining whether the hardware locations assigned as lost are present in any of the data structures in the KHT and also are present in any of the data structures in the PHDB;
    if so, then declaring the one or more lost peripheral hardware devices are lost, and presenting information from the data structures in the KHT for the one or more lost peripheral hardware devices as lost;
    determining whether at least one of the hardware locations for the one or more lost peripheral hardware devices assigned as lost is present in any of the data structures in the KHT but is not present in any of the data structures in the PHDB; and
    if so, then re-assigning the at least one of the hardware locations as not lost in the KHT.

2. The method of claim 1, further comprising:
    if determining there is no change detected in the connected peripheral hardware devices in the enterprise computer system, then declaring that there is no change in system resources assigned to the detected peripheral hardware devices and the enterprise computer system is configured per the detected peripheral hardware devices during the reboot.

3. The method of claim 1, wherein presenting information associated with the one or more lost peripheral hardware devices as lost comprises:
    outputting the information associated with the one or more lost peripheral hardware devices to a user.

4. The method of claim 1, further comprising:
    if there are no hardware locations present as assigned as lost during the reboot, then repeating the steps of initializing, initiating, comparing and determining during a next reboot.

5. The method of claim 1, further comprising:
    removing the data structures associated with the one or more peripheral hardware devices that are lost from the KHT and the PHDB.

6. The method of claim 1, wherein the data structures comprise persistent information selected from the group consisting of a hardware location id, instance number, class of hardware component, and driver names.

7. The method of claim 1, comprising: if the change is not associated with one or more lost peripheral hardware devices during the reboot, then declaring one or more new peripheral hardware devices are connected to the enterprise computer system, allocating new system resources to the newly detected peripheral hardware devices, and updating data structures associated with the newly detected peripheral hardware devices connected to the enterprise computer system into the PHDB and the KHT.

8. An article, comprising:
    a storage medium having instructions, that when executed by a computing platform, result in execution of a method of identifying whether there is any change in peripheral hardware devices connected to an enterprise computer system, comprising:
    initializing a kernel hardware table (KHT) stored in system memory by obtaining data structures associated with last detected connected peripheral hardware devices stored in a persistent hardware database (PHDB) of an external database upon reboot;
    initiating an enterprise computer system wide scanning to obtain and store the detected data structures associated with current connected peripheral hardware devices in the KHT during the reboot; and
    comparing the obtained data structures associated with the last detected connected peripheral hardware devices and the detected data structures associated with the current connected peripheral hardware devices to determine whether there is any change in system resources associated with the connected peripheral hardware devices during the reboot;
    if so, determining whether the change is associated with one or more lost peripheral hardware devices during the reboot;
    if so, then declaring as there is one or more lost peripheral hardware devices associated with the enterprise computer system and assigning in the KHT hardware locations associated with the one or more lost peripheral hardware devices as lost;
    determining whether the hardware locations assigned as lost are present in any of the data structures in the KHT and also are present in any of the data structures in the PHDB;

if so, then declaring the one or more lost peripheral hardware devices are lost, and presenting information from the data structures in the KHT for the one or more lost peripheral hardware devices as lost;

determining whether at least one of the hardware locations for the one or more lost peripheral hardware devices assigned as lost is present in any of the data structures in the KHT but is not present in any of the data structures in the PHDB; and if so, then re-assigning the at least one of the hardware locations as not lost in the KHT.

9. The article of claim 8, further comprising:
if determining there is no change detected in the connected peripheral hardware devices in the enterprise computer system, then declaring that there is no change in system resources assigned to the detected peripheral hardware devices and the enterprise computer system is configured per the detected peripheral hardware devices during the reboot.

10. The article of claim 8, wherein presenting the information associated with the one or more lost peripheral hardware devices as lost comprises:
outputting the information associated with the one or more lost peripheral hardware devices to a user.

11. The article of claim 8, further comprising:
if there are no hardware locations present as assigned as lost during the reboot, then repeating the steps of initializing, initiating, comparing and determining during a next reboot.

12. The article of claim 8, further comprising:
removing the data structures associated with the one or more peripheral hardware devices that are lost from the KHT and the PHDB.

13. The article of claim 8, wherein if the change is not associated with one or more lost peripheral hardware devices during the reboot, then declaring one or more new peripheral hardware devices are connected to the enterprise computer system, allocating new system resources to the newly detected peripheral hardware devices, and updating data structures associated with the newly detected peripheral hardware devices connected to the enterprise computer system into the PHDB and the KHT.

14. A system for identifying whether there is any change in peripheral hardware devices connected to an enterprise computer system, comprising:
a persistent hardware database (PHDB) stored in an external database;
system memory;
a kernel hardware table (KHT) stored in the system memory; and
a kernel memory management module (KHMM) residing in an operating system (OS) and communicatively coupled to the PHDB and the KHT, wherein the KHMM initializes the KHT by obtaining and storing data structures associated with last detected connected peripheral hardware devices stored in the PHDB upon reboot,
wherein the KHMM initiates an enterprise computer system wide scanning to obtain and store the detected data structures associated with current connected peripheral hardware devices in the KHT during the reboot,
wherein the KHMM determines whether there is any change in system resources associated with the connected peripheral hardware devices by comparing the obtained data structures associated with the last detected connected peripheral hardware devices and the data structures associated with the current connected peripheral hardware devices during the reboot,
wherein the KHMM determines whether the change is associated with one or more lost peripheral hardware devices during the reboot if there is a change in the system resources associated with the connected peripheral hardware devices,
wherein the KHMM declares as there is one or more lost peripheral hardware devices associated with the enterprise computer system and assigns in the KHT hardware locations associated with the assigned one or more lost peripheral hardware devices as lost if the KHMM determines that the change is associated with the one or more lost peripheral hardware devices,
wherein the KHMM determines whether the hardware locations assigned as lost are present in any of the data structures in the KHT and also are present in any of the data structures in the PHDB, if so, then the KHMM declares the one or more lost peripheral hardware devices are lost, and presents information from the data structures in the KHT for the one or more lost peripheral hardware devices as lost,
wherein the KHMM determines whether at least one of the hardware locations assigned as lost is present in any of the data structures in the KHT but is not present in any of the data structures in the PHDB, and if so, then re-assigning the at least one of the hardware locations as not lost in the KHT.

15. The system of claim 14, wherein the KHMM determines as no change is detected in the connected peripheral hardware devices in the enterprise computer system if there is no change in the system resources associated with the connected peripheral hardware devices found based on the outcome of the comparison.

16. The system of claim 14, wherein the information associated with the data structures associated with one or more lost peripheral hardware devices is presented to a user.

17. The system of claim 14, wherein the KHMM removes the data structure information associated with the one or more peripheral hardware devices that are lost from the KHT and the PHDB.

18. The system of claim 14, wherein the KHMM determines if the change is not associated with one or more lost peripheral hardware devices during the reboot, then declares one or more new peripheral hardware devices are connected to the enterprise computer system, allocating new system resources to the newly detected peripheral hardware devices, and updates data structures associated with the newly detected peripheral hardware devices connected to the enterprise computer system into the PHDB and the KHT.

* * * * *